US005103243A

United States Patent [19]

Cowger

[11] Patent Number: 5,103,243

[45] Date of Patent: Apr. 7, 1992

[54] VOLUMETRICALLY EFFICIENT INK JET PEN CAPABLE OF EXTREME ALTITUDE AND TEMPERATURE EXCURSIONS

[75] Inventor: Bruce Cowger, Corvallis, Oreg.

[73] Assignee: Hewlett-Packard Company, Palo Alto, Calif.

[21] Appl. No.: 473,298

[22] Filed: Feb. 1, 1990

Related U.S. Application Data

[62] Division of Ser. No. 286,567, Dec. 16, 1988, Pat. No. 4,920,362.

[51] Int. Cl.[5] .............................................. G01D 15/18

[52] U.S. Cl. ................................ 346/1.1; 346/140 R

[58] Field of Search ............................ 346/1.1, 140 R

[56] References Cited

U.S. PATENT DOCUMENTS 4,794,409 12/1988 Cowger et al. ................. 346/140 R
4,920,362 4/1990 Cowger ......................... 346/140 R
4,992,802 2/1991 Dion et al. .......................... 346/1.1
4,994,824 2/1991 Winslow ........................ 346/140 R

*Primary Examiner*—Benjamin R. Fuller
*Assistant Examiner*—Gerald E. Preston

[57] ABSTRACT

An ink jet pen is disclosed having a drop generator, a catchbasin and a plurality of interconnected ink chambers comprising an ink reservoir coupled therebetween. The ink is distributed among the chambers so that, at any given time, only one contains both air and ink. The others contain either all ink or all air. Consequently, environmental excursions that cause expansion of air in the reservoir act to drive ink from only one of the chambers to the catchbasin. (The other chambers either have no air that can expand or no ink that can be driven therefrom.) The pen can thus be constructed with a smaller catchbasin than prior art pens, thereby increasing its volumetric efficiency. The catchbasin size can be reduced to an arbitrarily small volume by segregating the ink reservoir into an correspondingly large number of commensurately small chambers.

7 Claims, 3 Drawing Sheets

VOLUMETRICALLY EFFICIENT INK JET PEN CAPABLE OF EXTREME ALTITUDE AND TEMPERATURE EXCURSIONS

CROSS REFERENCE TO RELATED APPLICATION

This is a division of application Ser. No. 07/286,567 filed on Dec. 16, 1988 by Bruce Cowger entitled VOLUMETRICALLY EFFICIENT INK JET PEN CAPABLE OF EXTREME ALTITUDE AND TEMPERATURE EXCURSIONS, now U.S. Pat. No. 4,920,362.

FIELD OF THE INVENTION

The present invention relates to ink jet printing systems, and more particularly to volumetrically efficient ink jet pens that can undergo arbitrarily large altitude and temperature excursions without leaking ink.

BACKGROUND AND SUMMARY OF THE INVENTION

Ink jet printers have become very popular due to their quiet and fast operation and their high print quality on plain paper. A variety of ink jet printing methods have been developed.

In one ink jet printing method, termed continuous jet printing, ink is delivered under pressure to nozzles in a print head to produce continuous jets of ink. Each jet is separated by vibration into a stream of droplets which are charged and electrostatically deflected, either to a printing medium or to a collection gutter for subsequent recirculation. U.S. Pat. No. 3,596,275 is illustrative of this method.

In another ink jet printing method, termed electrostatic pull printing, the ink in the printing nozzles is under zero pressure or low positive pressure and is electrostatically pulled into a stream of droplets. The droplets fly between two pairs of deflecting electrodes that are arranged to control the droplets' direction of flight and their deposition in desired positions on the printing medium. U.S. Pat. No. 3,060,429 is illustrative of this method.

A third class of methods, more popular than the foregoing, is known as drop-on-demand printing. In this technique, ink is held in the pen at below atmospheric pressure and is ejected by a drop generator, one drop at a time, on demand. Two principal ejection mechanisms are used: thermal bubble and piezoelectric pressure wave. In the thermal bubble systems, a thin film resistor in the drop generator is heated and causes sudden vaporization of a small portion of the ink. The rapidly expanding ink vapor displaces ink from the nozzle causing drop ejection. U.S. Pat. No. 4,490,728 is exemplary of such thermal bubble drop-on-demand systems.

In the piezoelectric pressure wave systems, a piezoelectric element is used to abruptly compress a volume of ink in the drop generator, thereby producing a pressure wave which causes ejection of a drop at the nozzle. U.S. Pat. No. 3,832,579 is exemplary of such piezoelectric pressure wave drop-on-demand systems.

The drop-on-demand techniques require that under quiescent conditions the pressure in the ink reservoir be below ambient so that ink is retained in the pen until it is to be ejected. The amount of this "underpressure" (or "partial vacuum") is critical. If the underpressure is too small, or if the reservoir pressure is positive, ink tends to escape through the drop generators. If the underpressure is too large, air may be sucked in through the drop generators under quiescent conditions. (Air is not normally sucked in through the drop generators because their high capillarity retains the air-ink meniscus against the partial vacuum of the reservoir.)

The underpressure required in drop-on-demand systems can be obtained in a variety of ways. In one system, the underpressure is obtained gravitationally by lowering the ink reservoir so that the surface of the ink is slightly below the level of the nozzles. However, such positioning of the ink reservoir is not always easily achieved and places severe constraints on print head design. Exemplary of this gravitational underpressure technique is U.S. Pat. No. 3,452,361.

Alternative techniques for achieving the required underpressure are shown in U.S. Pat. No. 4,509,062 and in copending application Ser. No. 07/115,013 filed Oct. 28, 1987, both assigned to the present assignee. In the former patent, the underpressure is achieved by using a bladder type ink reservoir which progressively collapses as ink is drawn therefrom. The restorative force of the flexible bladder keeps the pressure of the ink in the reservoir slightly below ambient. In the system disclosed in the latter patent application, the underpressure is achieved by using a capillary reservoir vent tube, or bubble generator, that is immersed in ink in the ink reservoir at one end and coupled to an overflow catchbasin open to atmospheric pressure at the other. As the printhead, which is also connected to the reservoir, draws ink from the reservoir, the internal pressure of the reservoir falls. This underpressure increases as ink is ejected from the reservoir. When the underpressure reaches a threshold value, it draws a small volume of air in through the capillary tube and into the reservoir, thereby preventing the underpressure from exceeding the threshold value.

While the foregoing two approaches for maintaining reservoir underpressure have proven highly satisfactory and unique in many respects, they nonetheless have certain drawbacks. For example, in the pen described in the above-referenced patent, as the flexible bladder reaches its fully collapsed state, the underpressure increases to the point that the drop generator can no longer draw ink therefrom and printing ceases with unused ink left in the bladder. The pen described in the above-referenced application is limited in the temperature and altitude extremes to which it can function properly. For example, if such a pen is transported in an aircraft cabin that is pressurized to an 8000 foot elevation, any air in the ink reservoir will expand in volume by a factor of approximately one third. If the volume of air in the reservoir is more than three times the volume of the catchbasin to which overflow from the capillary reservoir vent tube is routed, the air's expansion will drive more ink into the catchbasin than it can contain and the catchbasin will overflow. This problem can be solved by making the catchbasin large enough to contain the ink in any possible altitude or temperature circumstance, for example, by making the size of the catchbasin fully 35 percent the size of the ink reservoir. However, this solution is volumetrically inefficient and limits the amount of ink that a pen of a given volume can contain.

It is an object of the present invention to provide an ink jet pen that overcomes these problems.

It is a more particular object of the present invention to provide a volumetrically efficient ink jet pen that can undergo arbitrarily large altitude or temperature excursions with an arbitrarily small catchbasin.

According to one embodiment of the present invention, an ink jet pen is constructed with a plurality of ink chambers serially coupled together by small coupling orifices. An ink well extends downwardly from the first chamber and supplies ink to a drop generator positioned at the bottom thereof. A catchbasin extends beneath all of the chambers and is coupled to the last chamber in the series by a drop tube with a bubble generator on the top thereof.

In operation, the plurality of serially coupled chambers that comprises the pen's ink reservoir are initially all filled with ink. As ink is ejected from the first chamber by operation of the pen's drop generator, the partial vacuum induced therein is relieved by ink drawn into the first chamber from the second, which in turn draws ink from the third. The resulting partial vacuum in the third chamber is relieved by the introduction of air bubbles by the bubble generator.

As printing continues, the third reservoir eventually becomes depleted of ink and is filled instead with air introduced from the catchbasin. Thereafter, further printing draws ink from the second chamber into the first and draws bubbles of air from the third chamber into the second. Finally, when the second chamber becomes depleted of ink, further printing simply draws air bubbles into the first chamber from the second.

By the foregoing arrangement, only one chamber contains both air and ink at any given time. The others are filled either with ink or air. Consequently, altitude or pressure changes that cause air in the pen to expand operate on only one of the three chambers to drive ink therefrom, since the others either have no air that can expand or no ink that can be driven. The volume of ink driven to the catchbasin in the illustrated three chamber pen is thus just one third of that in a comparable single chamber pen for any given environmental excursion. Accordingly, the pen of the present invention can be manufactured with a catchbasin only one third the size as required in the prior art, thereby increasing the pen's volumetric efficiency and permitting more of the pen's volume to be used for the initial load of ink.

The principles of the present invention can be applied to pens with an arbitrarily high number of chambers, by which the requisite size of the catchbasin can be reduced to an arbitrarily small volume.

The foregoing and additional objects, features and advantages of the present invention will be more readily apparent from the following detailed description, which proceeds with reference to the accompanying drawings.

DETAILED DESCRIPTION

Figure 1:
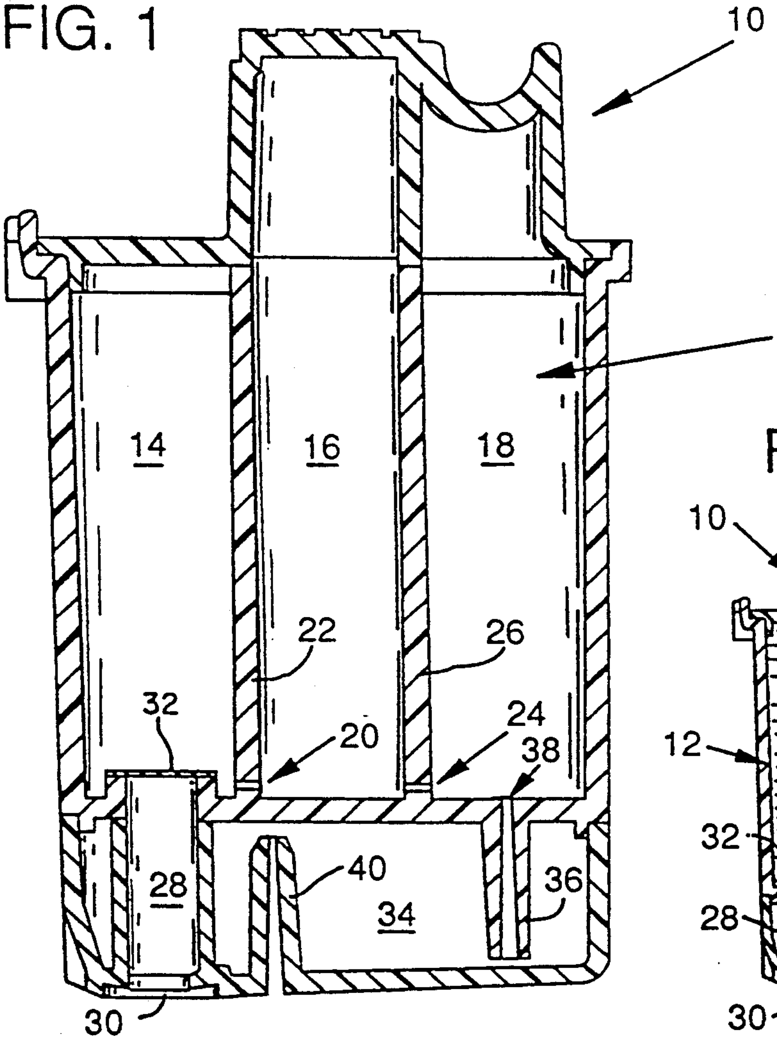
FIG. 1 is a sectional view of an ink jet pen according to one embodiment of the present invention.

Referring to FIGS. 1-4, an ink jet pen 10 according to one embodiment of the present invention includes a multi-chambered ink reservoir 12, here comprised of first, second and third chambers 14, 16 and 18, respectively. The first chamber 14 is coupled to the second chamber 16 by a small coupling orifice 20 positioned near the bottoms of said chambers in a lower portion of a first dividing wall 22. The second chamber 16 is similarly coupled to the third chamber 18 by a small coupling orifice 24 in a lower portion of a second dividing wall 26.

Extending downwardly from the first chamber 14 is an ink well 28 that supplies ink to a drop generator 30 disposed at the bottom thereof. Drop generator 30 is conventional in design and may comprise, for example, a thermal bubble type ink jet or a piezoelectric pressure wave type ink jet. Ink well 28 may have a filter 32 disposed thereon to prevent clogging of the printing orifices by foreign matter.

Extending beneath the chambers 14-18 is a catchbasin 34 that is coupled to the third chamber by a drop tube 36 that has a bubble generating orifice 38 on its top. The catchbasin is vented to ambient pressure by a chimney 40 extending upwardly therein from the base of the pen.

In operation, the three chambers 14-18 are initially all filled with ink. In this filled condition, altitude or temperature excursions have substantially no effect on the pen because there is no air in any of the chambers that can expand and drive ink therefrom. The ink volume itself does not change with altitude or temperature. The one element of the pen that does contain air, the catchbasin, is vented to ambient, so any expansion of the air therein is easily relieved.

During printing, air is introduced sequentially into the three chambers. When printing begins, the ejection of ink by the drop generator 30 causes a partial vacuum in the first chamber 14. This partial vacuum is relieved by the drawing of replacement ink into the first chamber from the second chamber 16 through the orifice 20. (Since the orifice 20 is wetted on both sides, it acts only as a fluid restriction. This restriction can be made arbitrarily small by the use of multiple orifices in parallel.) This drawing of ink from the second chamber likewise causes the second chamber to draw a corresponding volume of ink from the third chamber 18 through orifice 24.

When the partial vacuum in the third chamber 18 reaches a threshold value (about one and a half inches of water in the illustrated embodiment), it is sufficient to draw an air bubble through the bubble generator orifice 38. This pressure is termed the "bubble pressure" and is principally dependent on the diameter of orifice and the viscosity of the ink. In the illustrative embodiment, the bubble generator orifice 38 has a diameter of 0.012 inches. (Partial vacuums smaller than the bubble pressure are insufficient to overcome the surface tension at the ink/air interface and thus are unable to draw bubbles through the bubble generator.)

The introduction of an air bubble through the bubble generator 38 and into the third chamber 18 lowers the partial vacuum in that chamber below the threshold value momentarily, until continued ejection of ink again brings it to the bubble pressure and another bubble is introduced. Continued printing results in the periodic introduction of bubbles, causing the volume of air in the third chamber to increase. During this "steady state" printing condition, the underpressure in the third chamber oscillates in a closely bounded range about the bubble pressure. The first and second chambers are likewise regulated at this pressure since there is no pressure drop across the coupling orifices 20, 24. (A pressure drop only occurs at these orifices if there is ink on one side and air on the other.)

As printing continues, the third chamber 18 eventually becomes filled with air and exhausted of ink. Thereafter, it cannot replace the ink drawn from the second chamber by the first with ink, as was earlier the case. Instead, continued printing causes the introduction of bubbles of air into the second chamber from the third. (The third chamber is now at atmospheric pressure since there is no air/ink interface at bubble generator orifice 38.) With the third chamber filled with air, the coupling orifice 24 between the second and third chambers acts as a bubble generator. This orifice 24 is sized to produce the same pressure differential (or bubble pressure) as the bubble generator orifice 38 did earlier (i.e. about one and a half inches of water) so that the partial vacuum in the ink chambers 14, 16 does not change.

Continued operation of the pen likewise drains the second chamber 16 and fills it with air so that only the first chamber contains ink. Thereafter, air bubbles, rather than ink, are drawn into the first chamber to replace the volume lost due to printing. Again, the coupling orifice 20 serves as a bubble generator and maintains the pressure in the first chamber at the desired value below ambient.

Finally, the ink becomes exhausted from the first chamber and the pen must be replaced or refilled.

As noted earlier, when all of the chambers are filled with ink, altitude and temperature excursions have no effect since there is no air in the pen that can expand and drive ink to the catchbasin.

During the pen's first phase of printing, when the first and second chambers are filled with ink and there is some air in the third chamber, environmental changes which cause the air to expand will drive ink from the third chamber 18, through the bubble generator orifice 38 and into the catchbasin 34. In the illustrated example, the pen is designed to perform at altitude excursions of up to 8000 feet. At that altitude, air pressure is approximately three quarters of that at sea level, so the air trapped in the third chamber expands by an inversely proportional amount, or by a factor of one third. If the catchbasin volume is one third the volume of the third chamber, it will be more than sufficient to contain the expelled ink. (The only situation in which the volume required by the third chamber would fully increase by a factor of one third is if it is completely filled with air. In this case, there would be no ink to be driven into the catchbasin. To the extent that the third chamber does contain ink, it does not contain expandable air, so a catchbasin sized one third the volume of the third chamber is more than adequate to contain the anticipated ink overflow.)

When the environmental factors subsequently change and the volume of air trapped in the third chamber 18 contracts and returns to its original volume, a partial vacuum is formed in the third chamber that draws ink from the catchbasin 34, up the drop tube 36 and back into the third chamber through the bubble generator orifice 38.

The situation during the second phase of operation, in which the first chamber is full of ink, the third chamber is full of air, and the second chamber contains both, is similar. An environmental change that causes the volume of air in the second chamber to expand drives ink out of the second chamber, through the coupling orifice 24 and into the empty third chamber. A small volume of ink can be received in the third chamber without any being driven into the catchbasin 34. However, once the volume of ink driven into the third chamber is sufficient to cover the bubble generator orifice 38, the third chamber's link to atmospheric pressure is cut off and the chamber is effectively sealed. Further ink driven into the third chamber from the second causes a corresponding volume to be driven from the third chamber through the bubble generator orifice into the catchbasin. If a corresponding volume of ink was not driven into the catchbasin, the additional ink in the third chamber would have to work to compress the air trapped in that now-sealed chamber. The path of least resistance is for ink instead to leave the third chamber for the vented catchbasin. Consequently, substantially all of the ink driven from the second chamber 16 by the expansion of the air therein flows into the catchbasin. Only a small amount pools on the floor of the third chamber.

When the environmental conditions thereafter change and the air trapped in the second chamber 16 contracts in volume, a partial vacuum is formed in the second chamber that draws ink from the catchbasin 34, through the drop tube 36, the bubble generator orifice 38, the small pool on the floor of the third chamber and finally through the coupling orifice 24 and into the second chamber.

Figure 2:
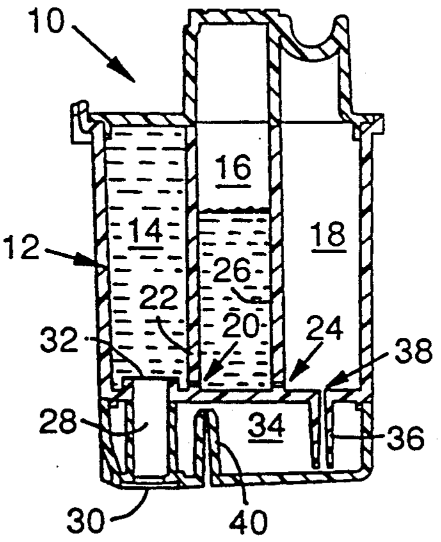
FIG. 2 is sectional view of the pen of FIG. 1 in a partially depleted condition.
Figure 3:
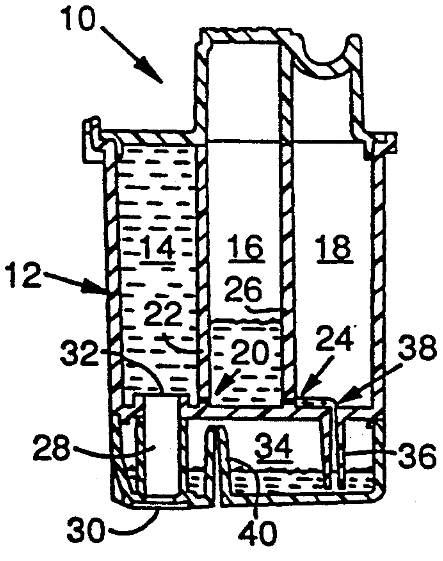
FIG. 3 is a sectional view of the pen of FIG. 2 after a temperature increase has expelled some of the ink in the second chamber to the catchbasin.
Figure 4:
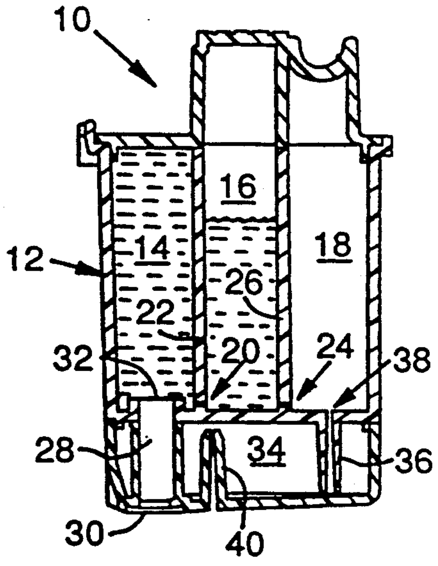
FIG. 4 is a sectional view of the pen of FIG. 3 after a temperature decrease has caused the ink formerly in the catchbasin to be drawn back into the second chamber.

This sequence of events is illustrated in FIGS. 2–4. FIG. 2 shows a pen according to the present invention in the second phase of its operation, i.e. with the first chamber 14 filled with ink, the third chamber 18 filled with air, and the second chamber 16 containing both. As the temperature rises, the air in the second chamber expands and drives ink through the third chamber 18 and into the catchbasin 34, as shown in FIG. 3. When the temperature thereafter falls, the ink in the catchbasin is drawn up and through the third chamber and back into the second chamber, as shown in FIG. 4.

A similar sequence of events occurs when both the second and third chambers are depleted of ink. A rise in temperature causes the air in the first chamber to expand, driving the ink therein through the orifice 20 to the second chamber 16, which is at atmospheric pressure due to open orifices 24 and 38. The ink driven from the first chamber collects in the second until the orifice 24 venting the second chamber is blocked by the expelled ink. Thereafter, continued expulsion of ink from the first chamber 14 forces ink from the pool on the floor of the second chamber 16 through the orifice 24 and into the third chamber 18. This ink again pools until it blocks the drop generator orifice 38, at which time ink is driven through it into the catchbasin 34. When the environmental conditions thereafter change and the air trapped in the first chamber 14 contracts in volume, the ink retraces its path up out of the catchbasin, through the drop generator 38, the third chamber 18, the orifice 24, the second chamber 16, the orifice 20 and finally back into the first chamber 14.

It will be recognized that the volume of the catchbasin is dependent on the altitude and temperature extremes to which the pen should function, and the volume of the largest ink chamber. In the simplest two chamber embodiment of the invention, assuming equal chamber volumes, the volume of air that can drive ink from the reservoir to the catchbasin is always less than half the volume of the reservoir. (Similarly, the volume of ink that can be driven from the reservoir to the catchbasin is always less than half the volume of the reservoir.) Consequently, the catchbasin can be one-half its usual size. The catchbasin size can be further reduced to an arbitrarily small volume by segregating the ink reservoir into an correspondingly large number of commensurately small chambers.

Figure 5:
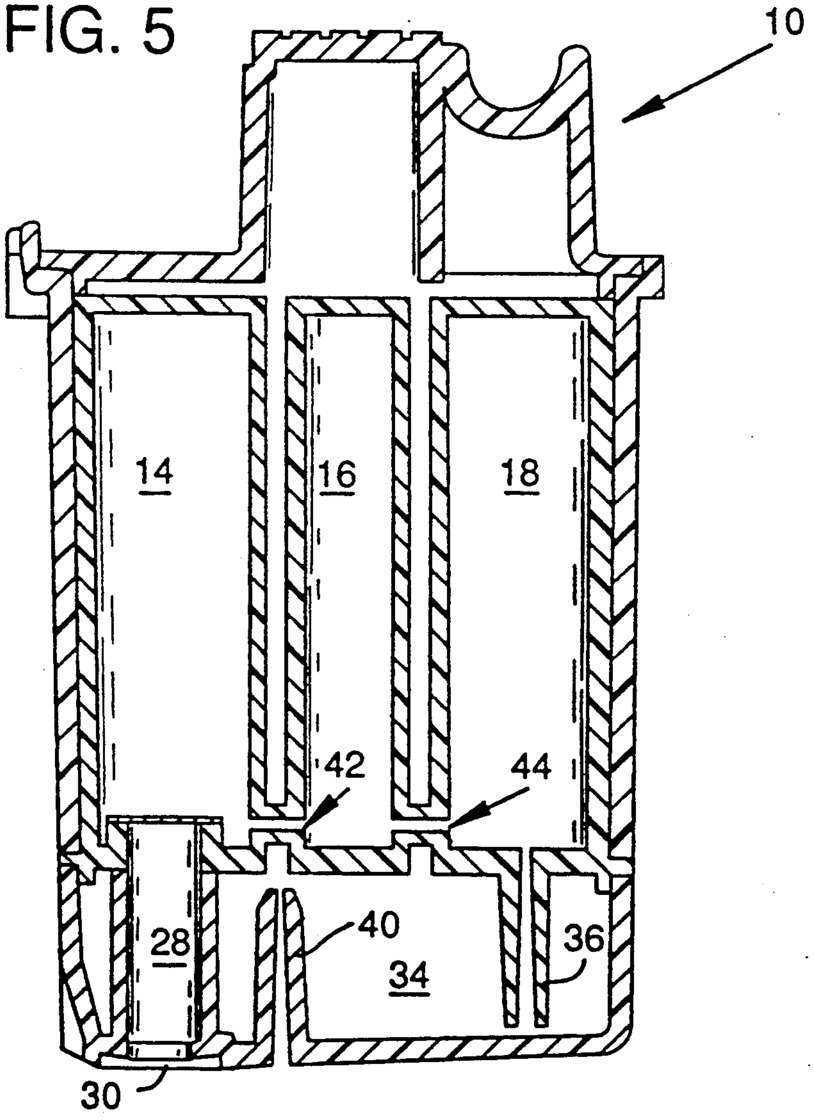
FIG. 5 shows a different, "cluster of grapes," embodiment of an ink reservoir usable with the pen of the present invention.

While the foregoing description has illustrated one embodiment of the invention, the principles thereof are equally applicable to a variety of other constructions. Exemplary is the ink chamber arrangement shown in FIG. 5. While in the FIG. 1 embodiment the reservoir was divided into a plurality of chambers by dividing walls defining coupling orifices, in FIG. 5 the chambers are in a "cluster of grapes" configuration and are coupled by coupling tubes 42 and 44 extending therebetween.

Figure 6:
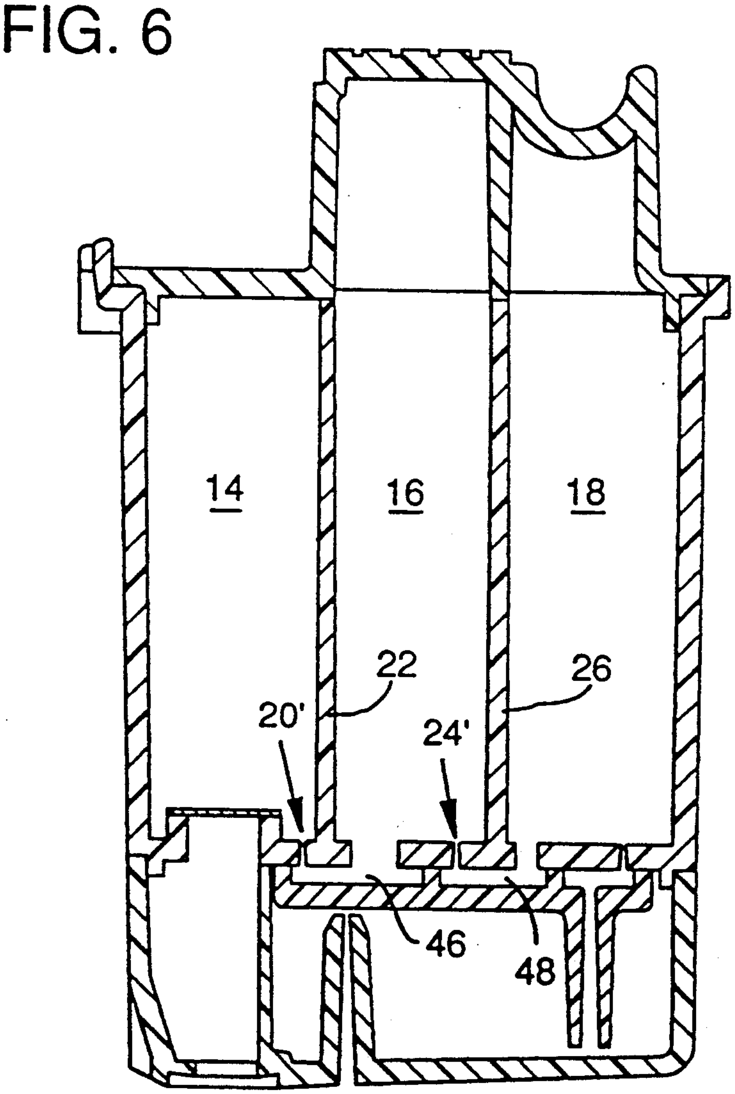
FIG. 6 shows another chamber interconnection arrangement wherein coupling conduits extend beneath the ink chambers.

Similarly, while the FIG. 1 embodiment shows the coupling orifices as positioned in the side walls of the chambers, they need not be so located. FIG. 6 shows an arrangement in which coupling orifices 20', 24' open to flow channels 46, 48 that extend beneath the walls dividing the chambers 14–18.

Having described and illustrated the principles of my invention with reference to a preferred embodiment and several variations thereof, it should be apparent that the invention can be further modified in arrangement and detail without departing from such principles. For example, while the invention has been described with reference to an ink reservoir comprised of serially connected ink chambers, a variety of other chamber interconnection topologies may advantageously be used. Similarly, while the invention has been illustrated as having only a single orifice coupling adjacent ink chambers, a plurality of coupling orifices can advantageously be used. (If only a single orifice is used, any foreign matter that becomes lodged in the orifice would critically impair operation of the pen. By using several orifices operated in parallel, the reliability of the pen is improved.) Similarly, while the invention has been described in the context of a single ink pen, the invention is equally applicable in multiple ink pens, such as pens in which cyan, yellow and magenta inks are delivered to one printhead. Finally, while the invention has been described as having a catchbasin for collecting expelled ink, a variety of other ink accumulation techniques may be adopted for this function, such as a flexible bladder.

In view of the wide range of embodiments to which the principles of the present invention can be applied, it should be understood that the embodiments described and illustrated should be considered illustrative only and not as limiting the scope of the invention. Instead, my invention is to include all such embodiments as may come within the scope and spirit of the following claims and equivalents thereto.

I claim:

1. A method of operating an ink jet pen for increasing the pen's volumetric efficiency, wherein the pen includes a plurality of interconnected chambers, the method comprising the step of:

distributing ink, throughout the pen's operation, among the chambers in such a manner that at any given time only one of said chambers contains both air and ink.

2. In a method of operating an ink jet pen that includes a reservoir and a catchbasin and in which the reservoir may contain both air and ink, an improvement comprising the steps:

limiting the volume of ink that can be driven from the reservoir to the catchbasin during environmental excursions to a volume less than half the volume of the reservoir.

3. In a method of operating an ink jet pen that includes a reservoir that may contain both air and ink, an improvement comprising the steps:

arranging the reservoir to define a plurality of chambers serially interconnected such that at any given time not more than one chamber contains an ink and air mixture.

4. The method of claim 3 including the step of connecting a catchbasin in series with the chambers such that the catchbasin collects all the ink expelled from the chamber containing the ink and air in response to a change in environmental pressure or temperature.

5. The method of claim 3 including the step of limiting the volume of air in the chamber containing the ink and air to a volume less than half of the reservoir volume.

6. In a method of operating an ink jet pen that includes a reservoir that may contain both air and ink, an improvement comprising the steps:

arranging the reservoir to define a plurality of chambers sequentially connected such that the chambers are emptied of ink one-at-a-time as the pen operates.

7. The method of claim 6 including the step of connecting a catchbasin to communicate with one of the chambers.

* * * * *